UNITED STATES PATENT OFFICE.

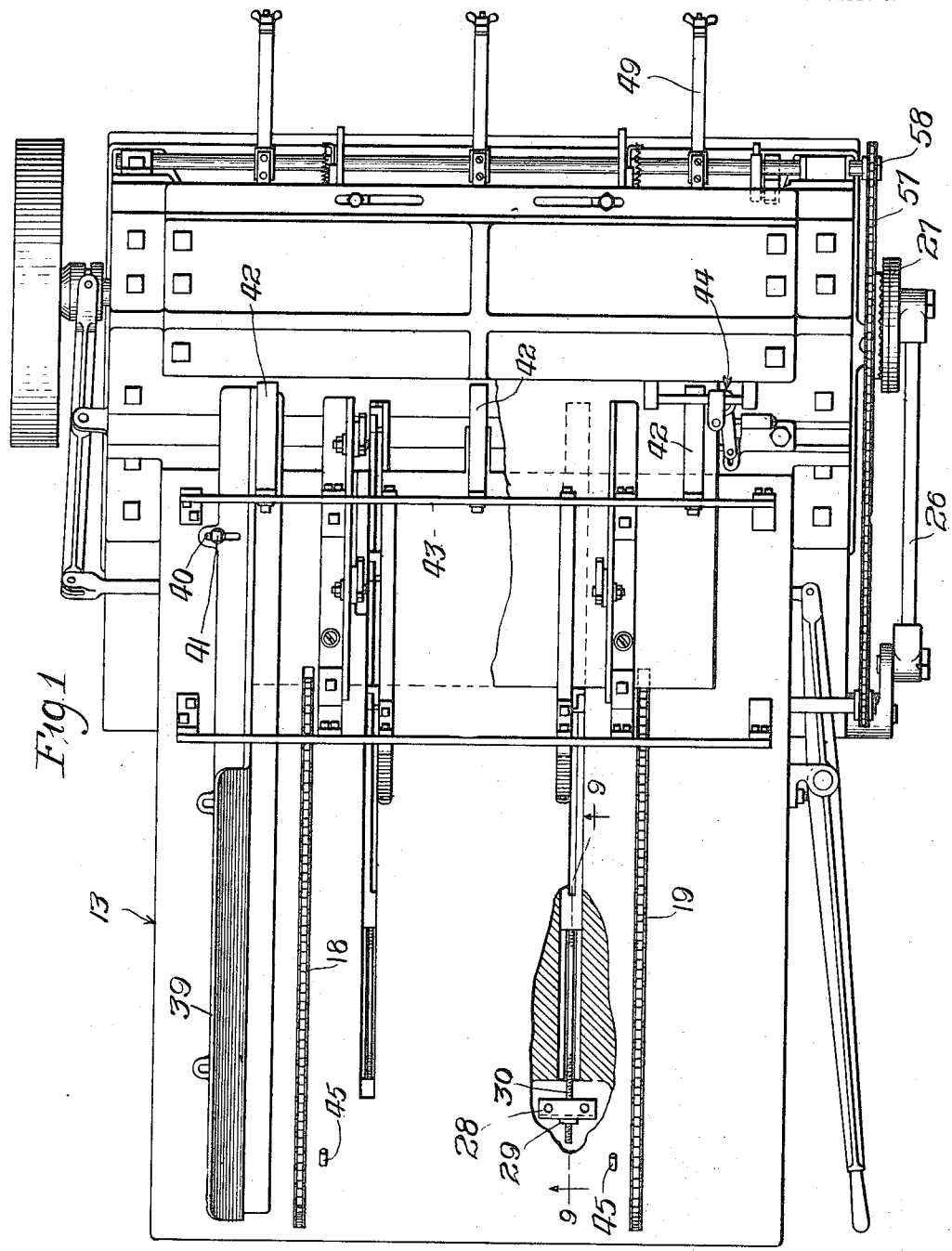

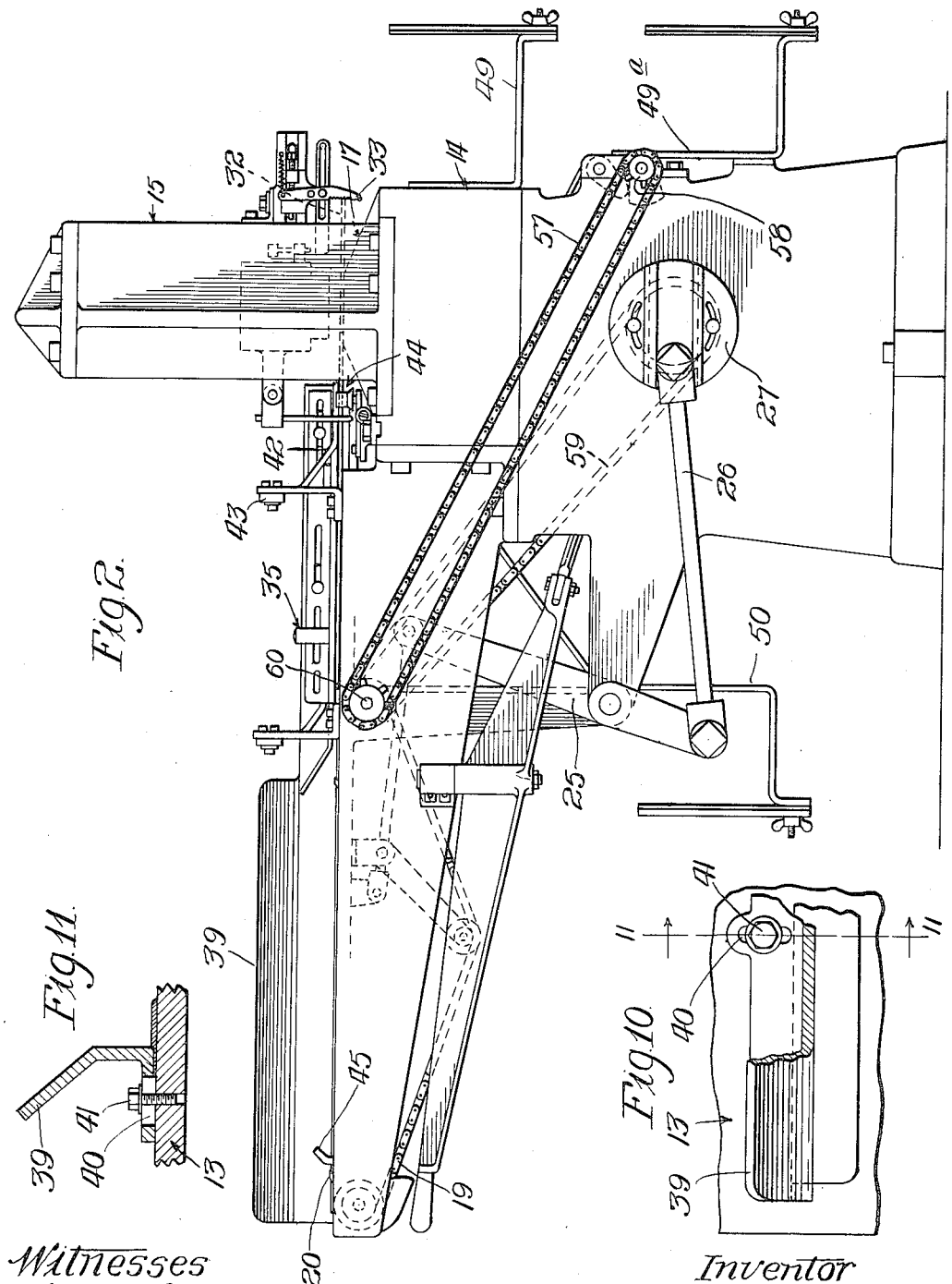

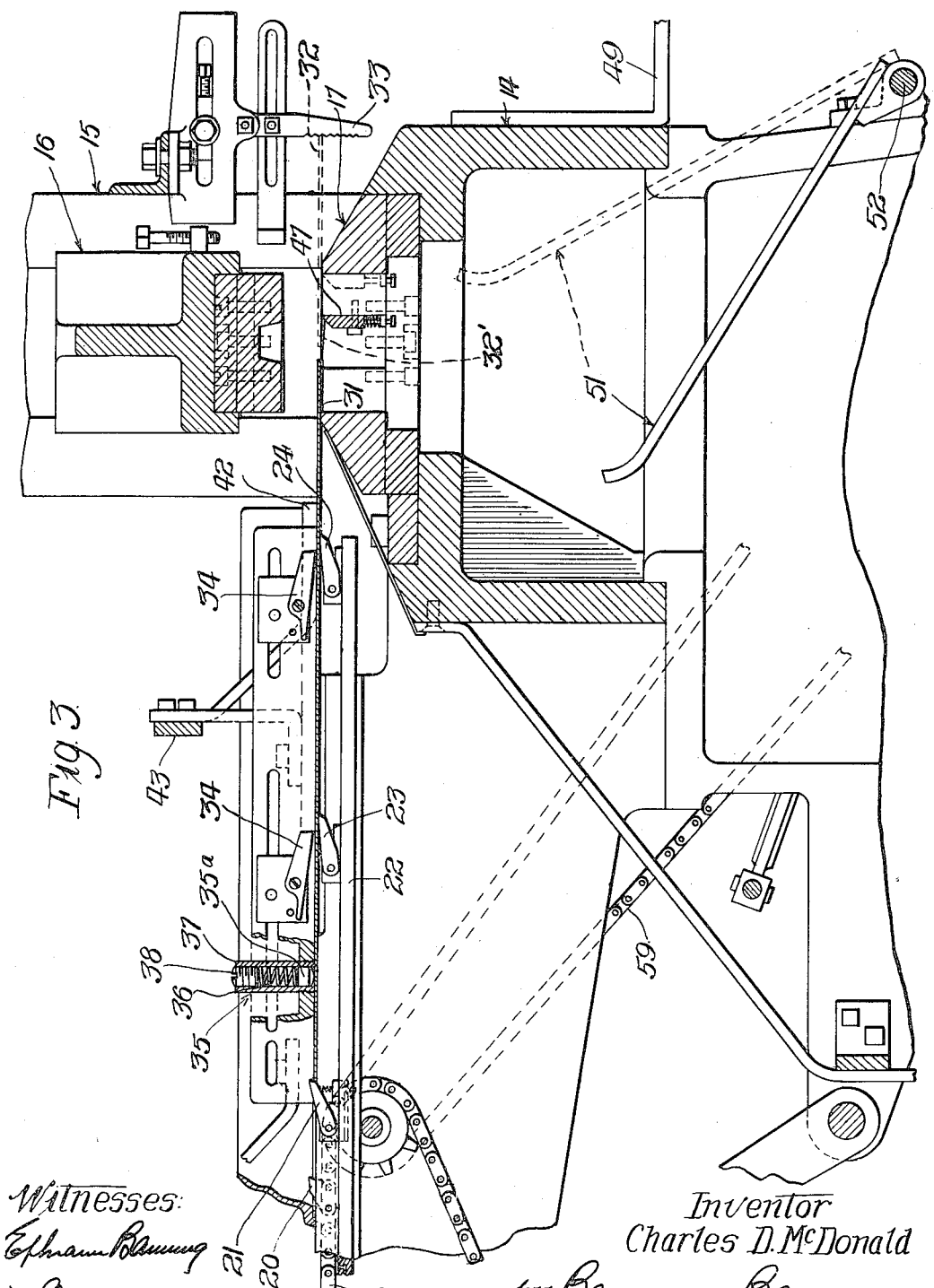

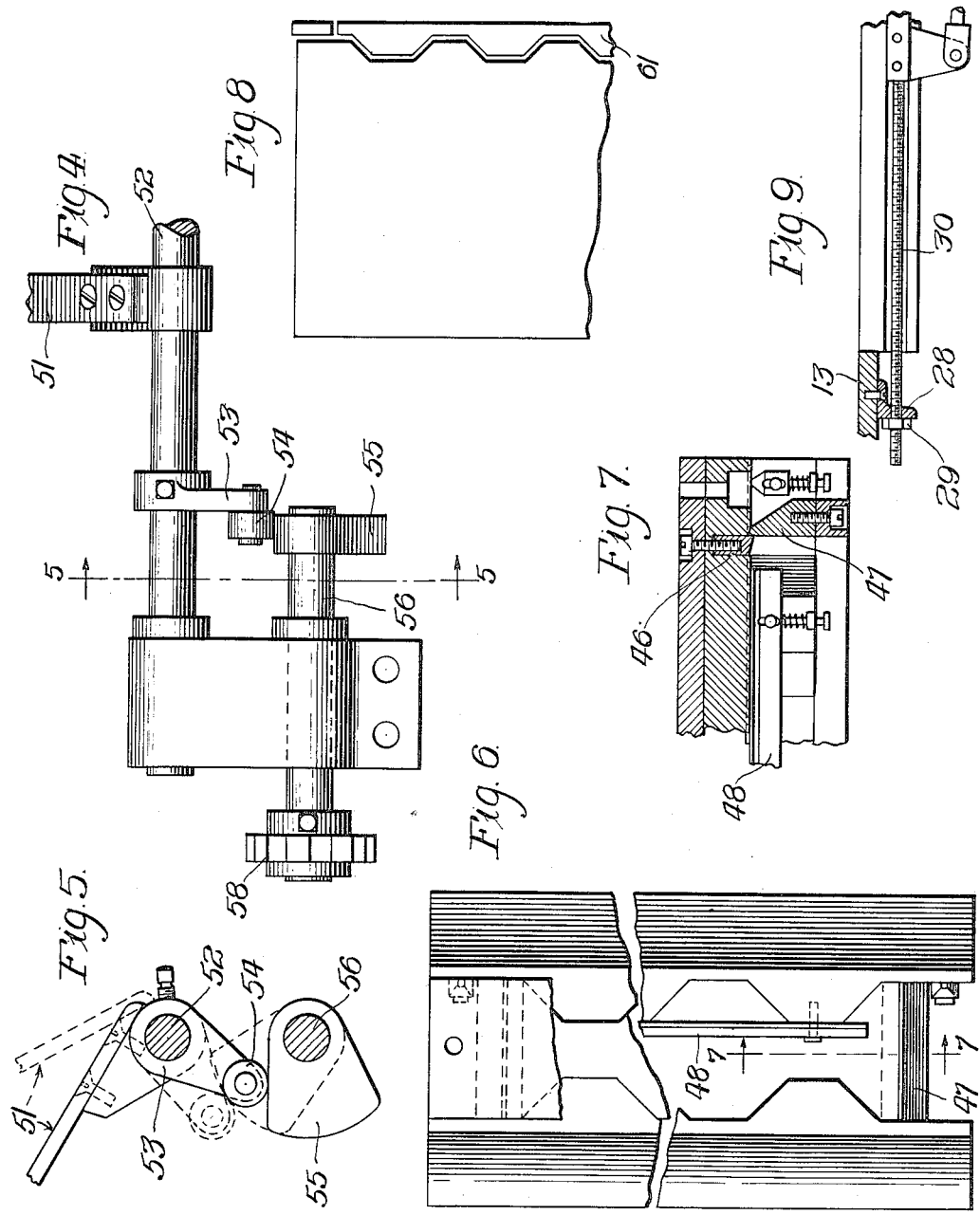

CHARLES D. McDONALD, OF CHICAGO, ILLINOIS, ASSIGNOR TO McDONALD MACHINE CO., OF CHICAGO, ILLINOIS, A CORPORATION OF ILLINOIS.

METAL-SHEARING MACHINE.

1,169,332. Specification of Letters Patent. Patented Jan. 25, 1916.

Application filed September 11, 1914. Serial No. 861,209.

*To all whom it may concern:*

Be it known that I, CHARLES D. McDONALD, a citizen of the United States, residing at Chicago, in the county of Cook and State of Illinois, have invented certain new and useful Improvements in Metal-Shearing Machines, of which the following is a specification.

The present invention relates to a machine for cutting a sheet of metal into strips, and is of that type of machine shown and described in Patent No. 1,110,810, granted to me Sept. 15, 1914, and Patent No. 1,141,644, granted to me June 1, 1915, both entitled Metal shearing machines.

The objects of the present invention are to provide means for centering the work with respect to the cutting mechanism prior to an initial or trimming cut.

A further object of the invention is to provide means for securely holding the work in place during the trimming cut.

A further object of the invention is to provide means for disposing of the strips of metal cut off by the trimming cut, so that it will not become mixed with the regular blanks.

The invention further consists in the features of construction and combinations of parts hereinafter described and claimed.

In the drawings: Figure 1 is a plan view of the machine of the present invention; Fig. 2 is a side elevation of said machine; Fig. 3 is a vertical section through the rear portion thereof; Fig. 4 is a plan view showing the mechanism for actuating the parts to accomplish the discharge of the strip cut in the trimming operation; Fig. 5 is a side view of the parts shown in Fig. 4, showing by means of dotted lines the parts in a moved position; Fig. 6 is a detail plan view of the cutting dies; Fig. 7 is a detail section of said dies; Fig. 8 is a detail showing a portion of the work with the strip cut away by the trimming operation; Fig. 9 is a detail showing the positive stop for the feed bar; Fig. 10 is a detail of the guide rail; and Fig. 11 is a section on line 11—11 of Fig. 10 looking in the direction of the arrows.

The present invention, as stated, relates to a machine for cutting a sheet of metal into strips, and as shown, is of the type known as double acting shearer; that is it employes two cutting dies and produces an excess of blanks computed in proportion to the number of actuations of the shearing mechanism. In cutting these blanks it has been found that owing to variations in the width of the work, one of the blanks cut, may, at times, be of excess width. This is undesirable since the gage rails of the die press in which the work is subsequently fed are spaced a distance for a certain width of blank, and an attempt at feeding a blank of excess width into the press results in a binding and a consequent clogging of the press feed.

The present invention is designed to provide means for producing a trimming cut in the first instance, whereby all blanks produced by the shearing machine, are of the exact width desired, and will properly feed into the die press.

Referring now to the drawings, and particularly to Figs. 1, 2 and 3, the machine comprises a table 13 of suitable shape and size, supported by a standard or base 14 also of suitable shape and size, and extending from the rear end of this base are guides 15, in which travels a movable cutting or shearing member 16. A fixed cutting or shearing member is designated by the numeral 17 and the particular shape of these shearing members are fully described in Patent No. 1,110,- 810, granted to me September 15, 1914, and Patent No. 1,141,644, granted to me June 1, 1915, above referred to and need not be described in detail in the present application.

Traveling across the surface of the table 13 are endless members 18 and 19, which in the form shown consist of sprocket chains, and each chain has a finger or fingers 20 arranged to project therefrom. These chains carry the work forward and deposit it in position to be engaged by the rearmost finger 21 of a reciprocating feed bar 22, said bar in the construction shown is provided with a second tooth 23 and a third tooth 24. The feed bar is reciprocated by means of a rocking lever 25, driven by an arm 26, connected to a slotted disk 27, on the main drive shaft, and in the present construction a means is provided for positively limiting the movement of this feed bar, which means is shown clearly in Figs. 1 and 9 and consists of a stop member 28 depending from the under side of the table 13, which is engaged by a nut or other suitable member 29, on a threaded stem 30, connected to the feed bar 22. This stop 28 and member 29 make a positive arresting means for the forward movement of the feed bar and prevents any overthrow of the same.

The stop is of particular utility in producing the trimming cut above referred to. The position of the work during the trimming operation or cut is clearly shown in Fig. 3, where it appears that the work is moved forward by the action of the feed bar until the front portion 31 of the work extends beyond the forward edge of the fixed cutting surface 17. The cutting member 16 then descends and this overlapping edge is cut off, trimming off any excess width from the sheet of work. By the subsequent movement of the feed bar the work is advanced, so that at the second movement it is placed in the position shown in dotted lines in Fig. 3, where a width 32 is extending beyond the rear of the cutting member 17, and a width 32' placed between the front and rear cutting members 17. It is obvious that as the movable cutting member 16 descends two blanks will be formed by this operation. The work is then again advanced by the last feeding movement and placed so that a width of the sheet of work extends both in front, and to the rear, of the fixed cutting members 17, as well as between said cutting members, so that at the third operation of the movable cutting member 16, three blanks are produced.

There has been previously described a means for centering the work with respect to the shearing means prior to the trimming cut. Other means are provided for centering the work with respect to the shearing mechanism at all feeding operations subsequent to the initial or trimming cut, which centering means consists of shiftable members 33, located to the rear of the cutting mechanism, and coöperating stops 34 located to the front of said mechanism. The method of operation of this centering means is fully shown and described in Patents No. 1,110,810 and No. 1,141,644, heretofore referred to and it is not deemed necessary to describe this operation in the present application. It is sufficient to say that the work is carried forward by the feed bar at each feeding movement a greater distance than is necessary, whereby the member 33 is forced rearward against the tension of a spring, and then when the feed bar recedes and releases from the work, the work is forced back against the stop 34 by the spring action of the member 33.

In order to insure that the work is fixedly held in position during the trimming cut, I provide auxiliary holding members 35, which consists of knob-like members 35ª held down by a spring 36, in tubes 37, the degree of pressure of these springs is controlled by means of a threaded member 38 within said tube. Extending across the table is a guide rail 39, adjustable by means of the slots 40 and bolts 41, and to insure against the work curling at the end of this guide rail, and make it certain that it will enter flat between the cutting dies, I employ shoe-like members 42, connected to a bridge 43, under which shoe-like members the work passes, and these members flatten out the work as the work passes beneath them insuring its entering between the cutting dies in a flat condition.

Shiftable means 44 are provided for supporting the work during the last shearing operation. This means, however, is described in Patents No. 1,110,810 and No. 1,141,644, heretofore referred to, and will not be described in detail in the present application.

In order to enable the operator to properly aline the work when initially placing it upon the table 13, I provide centering members 45 in the shape of pins, as shown. It will be noted that these pins extend in a diagonal direction, this is done to prevent any danger of the edge of the work being forced upward by the finger or fingers 20 and allowing said finger or fingers to pass underneath the work without engaging therewith. The diagonal position of the pins 45, as will be apparent, prevents any upward movement of the work, when the finger 20 comes into engagement therewith.

As explained in a co-pending application, Serial No. 848,781, filed by me July 3, 1914, for means for producing sheet metal blanks, it is necessary in the production of these blanks to cut a certain amount from the edge of certain of the blanks, and to accomplish this, I insert a cutting member 46 in the movable cutting member 16, which coöperates with a fixed cutting member 47, and produces the cross cut necessary to trim the edge of the blanks, I provide in the present construction means for stripping the blank from between the cutting dies consisting of a spring-pressed bar 48. There only remains to describe the means by which the strip produced by the trimming cut is ejected from the machine in a manner whereby it will not be mingled with the regular blanks.

By referring to Fig. 2, receptacles 49, 49ª, and 50 will be seen. The receptacle 49 being provided for the purpose of receiving the blanks formed from the metal projecting beyond the cutting dies, the receptacle 49ª for the blanks formed by the metal lying between said dies, and the receptacle 50 being provided for the blanks formed from the metal extending to the front of the cutting dies. By referring to Fig. 3 it will be seen that the edge of the sheet which is trimmed off in the trimming operation would naturally fall between the cutting dies and into the receptacle 49ª. To eliminate this, I provide a guide member 51, in the form, as shown, of a series of slats, which member is mounted upon a rock shaft 52 (see Figs. 3, 4, and 5). Attached to this rock shaft is an arm 53 provided on its end with a roller 54, and this roller engages with the surface of a cam 55, on a rotatable shaft 56, actuated by a belt or chain 57, and a sprocket and pulley 58, which in turn is driven by a belt or chain 59, extending from a pulley or sprocket 60 on the main driving shaft.

When the cutting die 16 descends to produce the trimming cut, the rock shaft 52 is moved to place the member 51 into the position shown in dotted lines in Fig. 3, so that the strip trimmed from the sheet of metal, drops into the space below the cutting dies, and onto the floor or into a suitable receptacle provided for the same. During the subsequent trimming operation, however, the member 51 lies in the position shown in full lines in Fig. 3 and the blanks dropping from between the cutting dies 17 strike this member, and are guided into the receptacle 49$^a$. Thus the trimmed edge of the work is discharged in a manner, so that it is not commingled with the blanks which will be subsequently used in the die press. The operation of the machine will be understood from the foregoing but briefly is as follows: The work is placed by the operator up against the pins 45. It is then engaged and carried forward by the finger or fingers 20 into position to have its rear edge engaged by the rear finger 21 of the feed bar 22. It is carried forward by the feed bar, until the movement of the feed bar is arrested by the stop 28 and member 29. This places the work in the position shown in full lines in Fig. 3. The movable cutting member 16 then descends, and a strip indicated by the numeral 61 in Fig. 8, is cut from the forward end of the sheet. The member 51 will then be in the dotted line position shown in Fig. 3, and this strip will fall onto the floor or into a suitable receptacle for it. During this trimming operation the work is held by means of the auxiliary pressure members 35. The second movement of the feed bar carries the work into the dotted position shown in Fig. 3 and two blanks are produced. The blank formed by the metal extending beyond the dies passing into the receptacle 49 and the blank produced by the metal between the dies fall into the receptacle 49$^a$, the member 51 having by this time moved to the full lined position of Fig. 3, and acts to guide these latter blanks into said receptacle. Upon the third movement of the feed bar a strip of work is placed beyond the cutting dies, to the front of the cutting dies, and between the cut dies, and upon the next operation of the cutting member 16 three blanks are formed, one is deposited into the receptacle 49, another into the receptacle 49$^a$ and the third, which is that portion of the work extending to the front of the cutting dies, into the receptacle 50.

I claim:

1. In a machine of the class described, the combination of shearing means, reciprocating feed means for carrying the work to the shearing means and a positive stop to limit the forward movement of said feeding means, substantially as described.

2. In a machine of the class described, the combination of shearing means, a reciprocating feed bar for feeding the work to the shearing means, a member on said bar, and a stop held with respect to the movements of the bar against which said member strikes to limit the movement of the bar, substantially as described.

3. In a machine of the class described, the combination of shearing means, a reciprocating feed bar for feeding the work to the shearing means, a table across which the work is fed, an adjustable member on said bar and a stop fixed with respect to the movement of the feed bar against which said member strikes to limit the movement of the feed bar, substantially as described.

4. In a machine of the class described, the combination of shearing means, a reciprocating feed bar for feeding the work to the shearing means, a member on the end of said bar, and a stop held with respect to the movements of the bar, against which said member strikes to limit the movement of the feed bar, said member and stop coöperating to center the work with respect to the shearing means to produce a trimming cut, substantially as described.

5. In a machine of the class described, the combination of shearing means, a reciprocating feed bar for feeding the work to the shearing means, a table across which the work is fed, an adjustable member adjacent the end of said bar, a stop fixed with respect to the movement of the feed bar against which said member strikes to limit the movement of the feed bar, the initial movement of the feed bar placing the work with respect to the shearing means to produce a trimming cut, substantially as described.

6. In a machine of the class described, the combination of shearing means, means for feeding the work to the shearing means, a receptacle for cut blanks, guiding means for conducting the blanks to said receptacle, means for placing the work with respect to the shearing means to produce a trimming cut of the work, and means for shifting said guiding means to deposit the strip produced by the trimming cut outside of said receptacle, substantially as described.

7. In a machine of the class described, the combination of shearing means, means for feeding the work to the shearing means, a receptatcle to receive cut blanks, means for placing the work with respect to the shearing means to produce a trimming cut, a guide for conducting the cut blanks to said receptacle, a rock shaft to which said guide is secured, and means for rocking said shaft just prior to the trimming cut, whereby said guide is swung into position to deposit the strip produced by the trimming cut outside of the receptacle, substantially as described.

8. In a machine of the class described, the combination of shearing means, means for feeding the work to the shearing means, a receptacle for cut blanks, means for placing the work with respect to the shearing means to produce a trimming cut of the work, a guide for conducting said blanks to said receptacle, a rock shaft to which the guide is secured, an arm extending from the rock shaft, a driven shaft, a cam on said driven shaft, said arm engaging said cam, and said cam being positioned, whereby said arm is rocked, to move the guide out of position during the trimming operation, whereby the strip produced by said operation is deposited outside of said receptacle, substantially as described.

CHARLES D. McDONALD.

Witnesses:
CHAS. E. ENNES,
W. J. MACKEY.

Copies of this patent may be obtained for five cents each, by addressing the "Commissioner of Patents, Washington, D. C."